US00RE44970E

(19) United States
(12) Reissued Patent
Tsukidate et al.

(10) Patent Number: US RE44,970 E
(45) Date of Reissued Patent: *Jun. 24, 2014

(54) PROGRAM INFORMATION BROADCASTING SYSTEM, BROADCASTING DEVICE, AND RECEIVING TERMINAL UNIT

(75) Inventors: Ryota Tsukidate, Osaka (JP); Kenichi Fujita, Osaka (JP); Shigeki Kaneko, Tokyo (JP); Yoshiyasu Takeuchi, Osaka (JP)

(73) Assignee: Panasonic Corporation, Osaka (JP)

( * ) Notice: This patent is subject to a terminal disclaimer.

(21) Appl. No.: 12/930,767

(22) Filed: Jan. 15, 2011

Related U.S. Patent Documents

Reissue of:
(64) Patent No.: 6,507,950
Issued: Jan. 14, 2003
Appl. No.: 08/956,344
Filed: Oct. 23, 1997

U.S. Applications:
(63) Continuation of application No. 11/338,588, filed on Jan. 24, 2006, and a continuation of application No. 11/033,490, filed on Jan. 11, 2005, now Pat. No. Re. 41,257, which is an application for the reissue of Pat. No. 6,507,950.

(30) Foreign Application Priority Data

Oct. 23, 1996 (JP) ..... 8-279755

(51) Int. Cl.
*G06F 3/00* (2006.01)
*G06F 13/00* (2006.01)
*H04N 5/445* (2011.01)

(52) U.S. Cl.
USPC ..... 725/54; 725/23; 725/24; 725/39; 725/50; 725/51

(58) Field of Classification Search
None
See application file for complete search history.

(56) References Cited

U.S. PATENT DOCUMENTS 5,038,211 A * 8/1991 Hallenbeck ..... 348/460
5,223,924 A 6/1993 Strubbe (Continued)

FOREIGN PATENT DOCUMENTS

CN 1115950 A 1/1996
EP 0758833 A 2/1997

(Continued)

OTHER PUBLICATIONS

Japanese Office Action dated Jul. 6, 2010 issued in Japanese Patent Application No. 2010-038306 and English translation thereof.

(Continued)

*Primary Examiner* — Brian Yenke
(74) *Attorney, Agent, or Firm* — Greenblum & Bernstein, P.L.C.

(57) ABSTRACT

In a program information broadcasting system, it is aimed to minimize time for retrieval of program by viewers in operating an electronic program guide or time for waiting when applying for subscription. As a program information broadcasting system, program elements constituting a broadcasting program are divided into a plurality of items and are turned to data at a center, and a master data 21 of a program information to recognize the program is prepared. From the data constituting the master data, minimal necessary items for preparation of a program table are extracted, and a program basic information 22 is prepared. Said master data and said program basic information are transmitted simultaneously with the broadcasting, and said program basic information is received, reproduced and displayed before receiving of the master data at a receiving terminal unit 31 is completed. As a result, the program basic information having far less amount of data than the master data can be incorporated, and it is possible to minimize the time required for storage of the data in memory of the receiving terminal unit.

2 Claims, 10 Drawing Sheets

(56) References Cited

U.S. PATENT DOCUMENTS

| | | | |
|---|---|---|---|
| 5,438,355 | A | 8/1995 | Palmer |
| 5,473,609 | A | 12/1995 | Chaney |
| 5,485,221 | A | 1/1996 | Banker et al. |
| 5,515,106 | A | 5/1996 | Chaney et al. |
| 5,539,822 | A | 7/1996 | Lett |
| 5,559,548 | A | 9/1996 | Davis et al. |
| 5,559,549 | A | 9/1996 | Hendricks et al. |
| 5,585,838 | A | 12/1996 | Lawler et al. |
| 5,592,551 | A | 1/1997 | Lett et al. |
| 5,630,119 | A | 5/1997 | Aristides et al. |
| 5,657,072 | A | 8/1997 | Aristides et al. |
| 5,666,645 | A | 9/1997 | Thomas et al. |
| 5,686,954 | A | 11/1997 | Yoshinobu et al. |
| 5,760,820 | A | 6/1998 | Eda et al. |
| 5,774,666 | A | 6/1998 | Portuesi |
| 5,801,753 | A | 9/1998 | Eyer et al. |
| 5,844,620 | A | 12/1998 | Coleman et al. |
| 5,847,770 | A | 12/1998 | Yagasaki |
| 5,867,207 | A | 2/1999 | Chaney et al. |
| 5,966,120 | A | 10/1999 | Arazi et al. |
| 6,005,562 | A | 12/1999 | Shiga et al. |
| 6,026,164 | A | 2/2000 | Sakamoto et al. |
| 6,028,599 | A | 2/2000 | Yuen et al. |
| 6,064,378 | A | 5/2000 | Chaney et al. |
| 6,237,145 | B1 | 5/2001 | Narasimhan et al. |
| 6,247,176 | B1 | 6/2001 | Schein et al. |
| 6,266,814 | B1 | 7/2001 | Lemmons et al. |
| 6,336,099 | B1 | 1/2002 | Barnett et al. |
| 6,502,241 | B1 | 12/2002 | Kretz et al. |
| 6,502,242 | B1 | 12/2002 | Howe et al. |
| 6,515,680 | B1 | 2/2003 | Hendricks et al. |
| 6,539,548 | B1 | 3/2003 | Hendricks et al. |
| 6,631,523 | B1 | 10/2003 | Matthews, III et al. |
| 6,661,468 | B2 | 12/2003 | Alten et al. |
| 6,668,377 | B1 | 12/2003 | Dunn |
| 6,724,431 | B1 | 4/2004 | Alton |
| 6,732,369 | B1 | 5/2004 | Schein et al. |
| 6,769,128 | B1 | 7/2004 | Knee et al. |
| 6,785,905 | B1 | 8/2004 | Nishioka |
| 6,826,775 | B1 | 11/2004 | Howe et al. |
| 6,941,574 | B1 | 9/2005 | Broadwin et al. |
| 7,370,026 | B2 | 5/2008 | Goldschmidt Iki et al. |

FOREIGN PATENT DOCUMENTS

| | | |
|---|---|---|
| JP | A-H05-068251 | 3/1993 |
| JP | A-H06-217271 | 8/1994 |
| JP | A-H07-023356 | 1/1995 |
| JP | H07-336316 | 12/1995 |
| JP | H07-336318 | 12/1995 |
| JP | H08-006878 | 1/1996 |
| JP | A-H08-070451 | 3/1996 |
| JP | H08-251120 | 9/1996 |
| JP | H08-289266 | 11/1996 |
| JP | H08-006878 | 1/1998 |
| JP | H08-251120 | 9/1998 |
| WO | 94/14284 | 6/1994 |
| WO | 95/01056 | 1/1995 |
| WO | WO 9528799 A | 10/1995 |

OTHER PUBLICATIONS

Office Action, mailed Feb. 4, 2014, in Reissue U.S. Appl. No. 13/216,835.

* cited by examiner

PROGRAM INFORMATION BROADCASTING SYSTEM, BROADCASTING DEVICE, AND RECEIVING TERMINAL UNIT

Matter enclosed in heavy brackets [ ] appears in the original patent but forms no part of this reissue specification; matter printed in italics indicates the additions made by reissue.

*Notice: More than one patent application has been filed for the reissue of U.S. Pat. No. 6,507,950. In addition to the instant continuation reissue application, there are two (2) additional division reissue applications:, Ser. No. 11/338,588 that is still pending and Ser. No. 11/033,490 that has now matured into U.S. Pat. No. Re. 41,257.*

*The instant application is a continuation of reissue application Ser. No. 11/033,490, filed Jan. 11, 2005, now Reissue U.S. Pat. No. Re. 41,257, and a continuation of application Ser. No. 11/338,588, filed Jan. 24, 2006. The entire contents of application Ser. Nos. 11/338,588 and 11/033,490 (now U.S. Pat. No. Re. 41,257) are incorporated herein by reference.*

BACKGROUND OF THE INVENTION

1. Field of the Invention

The present invention relates to a program information broadcasting system for broadcasting information of component elements to constitute a program such as category information, performer information, etc. of each of the programs to be broadcast, and further to a broadcasting device used for the above broadcasting system, and to a receiving terminal unit for receiving various types of program information thus broadcast and for displaying the information quickly and efficiently.

2. Description of the Prior Art

In recent years, with development and progress of communication technique and data processing technique, multi-media information such as audio information or video information is digitalized and offered to users. Also, with the introduction of large capacity storage medium in the market, it is now possible to provide a broadcasting system, which can send a large amount of data via broadcasting or communication facilities, and receive and accumulate the information at a terminal unit on user side so that the users can view it at any time desired.

Normally, in case a viewer receives and views a broadcasting program using a receiving terminal unit such as television receiver or radio receiver, the user is informed of program content and broadcasting schedule on program schedule in television/radio page of newspapers or magazines and decides the program to view or listen. When the user wants to subscribe a program, it is necessary to input and set broadcasting channel, scheduled broadcasting time, etc. of the program found on newspapers or magazines. In this respect, when the user does not have newspaper or magazine at hand, program subscription cannot be inputted because no program schedule can be referred.

Under such circumstances, it is now partially practiced, in case of television broadcasting, for example, to use a new type of television receiver provided with a data decoder, by which program information including program title and other information is broadcast in multiplex on video signal via teletext or the like, and program schedule can be displayed on screen of the television receiver. As an example, in digital satellite broadcasting, which has been recently started in Japan, program information and broadcasting program are broadcast.

In the broadcasting of program information as proposed in the past, broadcasting center prepares and transmits a program information (master data) and transmits the program information in broadcasting, and the data of the broadcast program information is received and reproduced (or decoded) and displayed on display unit. Included in the program information related to each program are program identification number, program title, broadcasting channel, explanation of program content, program category, individual key word relating to the program (data items such as performer, director, original author, etc.; generally called "items"), date and time of broadcast starting, date and time of completion of broadcasting, etc.

In the digital satellite broadcasting, the program information is transmitted at the same time as the broadcasting program. By receiving the program information, electronic program guide (also called "EPG") is prepared, and program information is displayed to the users. Using the electronic program guide, the user can obtain various types of information relating to the program on television screen in the same manner as the checking of program on newspaper or other media. Also, it is possible to subscribe or purchase the program using the electronic program guide. The electronic program guide is practically used in the digital satellite broadcasting, which is currently in the stage of practical application. in case program information is retrieved on the electronic program guide as described above, the data of the program information is received by a receiving terminal unit, stored in memory of the receiving terminal unit for once, and is displayed on display screen after retrieval.

However, in the broadcasting of program information as proposed in the past, data is retrieved only after all of the data to be retrieved is incorporated in memory or retrieval of the data is conducted while incorporating the data. In any case, the retrieval cannot be completed until all of the program information is completely incorporated, and the user must wait for relatively long time until program information is actually displayed after an instruction to display the program information is inputted.

SUMMARY OF THE INVENTION

[To solve the above problems, it is a first object of the present invention to provide a program information broadcasting system, a broadcasting device and a receiving terminal unit in the program information broadcasting system, by which it is possible to minimize waiting time in retrieving or in subscribing a program when the user retrieves program by checking program guide.]

[It is a second object of the present invention to provide a program information broadcasting system, a broadcasting device and a receiving terminal unit, by which it is possible to increase degree of freedom to issue coupon in case coupon is given to the user to the program, which can be broadcast by adding mail.]

[To attain the above objects, in the program information broadcasting system of the present invention, program components of the program to be broadcast are divided into a plurality of items and are turned to data at a broadcasting center, a master data of the program information to recognize the program is prepared, minimal necessary items for preparation of a program guide are extracted from each of the data of the master data, and a program basic information is prepared, the above master data and the program basic information are transmitted at the same time as the broadcasting, and the program basic information is received, reproduced and displayed before the master data is completely received at the receiving terminal unit.]

[As described in the above arrangement, program basic information is transmitted via broadcasting in addition to the master data of the program information. Because the program basic information has far less amount of data compared with the master data, it is possible to minimize the time to incorporate the program basic information on all of the program information by the receiving terminal unit and to completely store the information in the memory of the receiving terminal unit. For this reason, it is also possible to retrieve and to quickly perform processing to display the information on display screen and to efficiently carry out program information display operation.]

[According to the invention as set forth in Claim 1 of the present application, program components of a program to be broadcast are divided into a plurality of items and are turned to data at a center, a master data of the program information to recognize the program is prepared, minimal necessary items for preparation of program guide are extracted from each of the data of the master data and a program basic information is prepared, the above master data and the program basic information are transmitted at the same time as the broadcasting, and the program basic information is received, reproduced and displayed before the master data is completely received, whereby it is possible to minimize the time to incorporate the program basic information on all of the program information by the receiving terminal unit and to completely store the information in the memory of the receiving terminal unit.]

[According to the invention as set forth in Claim 2 of the present application, there is provided the program information broadcasting system according to Claim 1, wherein the program basic information is prepared by extracting information with higher utilization frequency and program information with higher utilization frequency is quickly received and displayed.]

[In the invention as set forth in Claim 3 of the present application, there is provided the program information broadcasting system according to Claim 1, wherein the program basic information is prepared by extracting data according to predetermined attributes from the master data of the program information, and the program information suitable for preference and satisfying requirements of the user can be quickly received and displayed.]

[In the invention as set forth in Claim 4 of the present application, there is provided the program information broadcasting system according to Claim 3, wherein the attributes for preparation of the program basic information are related at least to one of program category, individual information, or service provider.]

[In the invention as set forth in Claim 5 of the present application, there is provided the program information broadcasting system according to Claim 4, wherein as many types of program basic information as related to the above attributes are prepared.]

[In the invention as set forth in Claim 6 of the present application, there is provided the program information broadcasting system according to Claim 5, wherein said plurality of program basic information comprise data where the attributes used as basis of preparation of the program basic information are turned to key codes and prepared in a summarized table and data prepared from identification information of the programs extracted based on the attributes and turned to a summarized table, whereby the data prepared by turning the attributes to key codes and prepared in a summarized table are linked to the data prepared from identification information in a summarized table.]

[The invention as set forth in Claim 7 of the present application provides the program information broadcasting system according to one of Claims 1 to 6, wherein the master data and the program basic information are transmitted at different cycles.]

[The invention as set forth in Claim 8 of the present application provides the program information broadcasting system according to Claim 7, wherein the master data and the program basic information are transmitted in such manner that the master data are transmitted at longer cycle than the program basic information.]

[The invention as set forth in Claim 9 of the present application provides the program information broadcasting system according to any one of Claims 1 to 8, wherein, when transmitting the program information, the data used for preparation of the program basic information is deleted from the master data and a program extended information is prepared, and the program basic information and the program extended information are linked together and are transmitted.]

[The invention as set forth in Claim 10 of the present application provides the program information broadcasting to system according to Claim 1, wherein program information is transmitted and mail is broadcast at the center, and the mail and the program information are linked together, and the receiving terminal unit can gain access to the link data of the program information from the received mail.]

[The invention as set forth in Claim 11 of the present application provides the program information broadcasting system according to Claim 10, wherein data to call functions which enables the user to participate in voting, reply to questionnaire, etc., are incorporated in the mail to be sent.]

[The invention as set forth in Claim 12 of the present application provides the program information broadcasting system according to Claim 11, wherein, when transmitting the mails, a summarized table of the mail is broadcast, whereby the receiving terminal unit checks whether the items listed in the summarized table of the mail have been already read or not, and only the mails not yet read are displayed.]

[The invention as set forth in Claim 13 of the present application provides the program information broadcasting system according to Claim 11, wherein, when the mail is transmitted, the mail is transmitted with some receiving condition, whereby the receiving terminal unit checks whether the user of the unit satisfies the receiving condition or not, and the mail is displayed only when the receiving conditions are met.]

[The invention as set forth in Claim 14 of the present application provides a broadcasting device, which comprises program information data preparing means for dividing program components of the program to be broadcast into a plurality of items to turn them to data form and for preparing master data of program information to recognize the program, information retrieval means for retrieving and extracting minimal necessary items for preparation of a program guide from the master data, transmitting data generating means for converting the master data and the program basic information to transmittable data, and transmitting means for transmitting the transmission data, whereby the receiving terminal unit can incorporate program basic information for all of the program information because the program basic information has far less amount of data than the master data, and it is possible to minimize the time to complete storage of the information in the memory of the receiving terminal unit.]

[The invention as set forth in Claim 15 of the present application provides a broadcasting device according to Claim 14, wherein there are provided mail data preparation means for preparing mail data in addition to the program information data preparing means, and transmission information data base means for integrating the program information data with the mail data and for sending it to the transmission data generating means.]

[The invention as set forth in Claim 16 of the present application provides the broadcasting device according to Claim 15, wherein the transmission information data base means sends the data integrated from the program information data and the mail data to the information retrieval means.]

[The invention as set forth in Claim 17 of the present application provides the broadcasting device according to Claim 15 or 16, wherein there is further provided voting and questionnaire preparing means for preparing voting and questionnaire data and for sending the data to the program information data preparing means.]

[The invention as set forth in Claim 18 of the present application provides the broadcasting device according to Claim 17, wherein the voting and questionnaire preparing means sends the prepared voting and questionnaire data to the mail data preparing means.]

[The invention as set forth in Claim 19 of the present application comprises broadcasting data receiving means for receiving master data of the broadcast program information, program basic information preparing means for extracting minimal necessary data for preparation of program guide from each of the data of the received master data and for preparing the program basic information, storage means for storing data of the program basic information, reproducing means for reproducing data of the received program information and the program basic information, display means for displaying the program information thus broadcast, and control means for controlling each of the above operations whereby the control means is provided with the functions to receive the master data of the program information when an instruction to display the program information is inputted and reads the program basic information from the storage means, prepares a summarized table of program and displays on the display means.]

[The invention as set forth in Claim 20 of the present application provides the broadcasting device according to Claim 19, wherein the program basic information is prepared by extracting information with higher utilization frequency.]

[The invention as set forth in Claim 21 of the present application provides the receiving terminal unit according to Claim 19, wherein the program basic information is prepared by extracting data according to the predetermined attributes from the master data of the program information.]

[The invention as set forth in Claim 22 of the present application provides the receiving terminal unit according to Claim 21, wherein the attributes forming basis for preparation of the program basic information are related to at least one of program category, individual information, or service provider.]

[The invention as set forth in Claim 23 of the present application provides the broadcasting device according to Claim 22, wherein as many types of the program basic information as related to the attributes are prepared.]

[The invention as set forth in Claim 24 of the present application provides the receiving terminal unit according to Claim 23, wherein a plurality of the program basic information comprise data prepared by turning the attributes for preparation of the program basic information to key codes and arranged in a summarized table and data prepared from identification information of the programs extracted based on the attributes and prepared in a summarized table, wherein the data prepared by turning the attributes to key codes and arranged in a summarized table are linked to the data prepared from the identification information in a summarized table.]

*The program information broadcasting method includes preparing program basic information including a title and an ID for each of a plurality of programs, and transmitting the program basic information. In the method, the program basic information further includes an address that links the program basic information to master information. Additionally, the program basic information and the master information are derived only from a same plurality of programs to be broadcast.*

*In another embodiment, the program information broadcasting method includes preparing program basic information including a title and an ID for each of a plurality of programs, and transmitting the program basic information. In the method, the program basic information further includes an address that links the program basic information to master information. Additionally, the program basic information and the master information are derived only from a same plurality of programs to be broadcast. Furthermore, the program basic information is received before completion of receipt of the master information.*

BRIEF DESCRIPTION OF THE DRAWINGS

These and other objects of the present invention will become more readily apparent from the following detailed description taken in conjunction with the attached drawings in which.

DETAILED DESCRIPTION OF THE INVENTION

Figure 1:
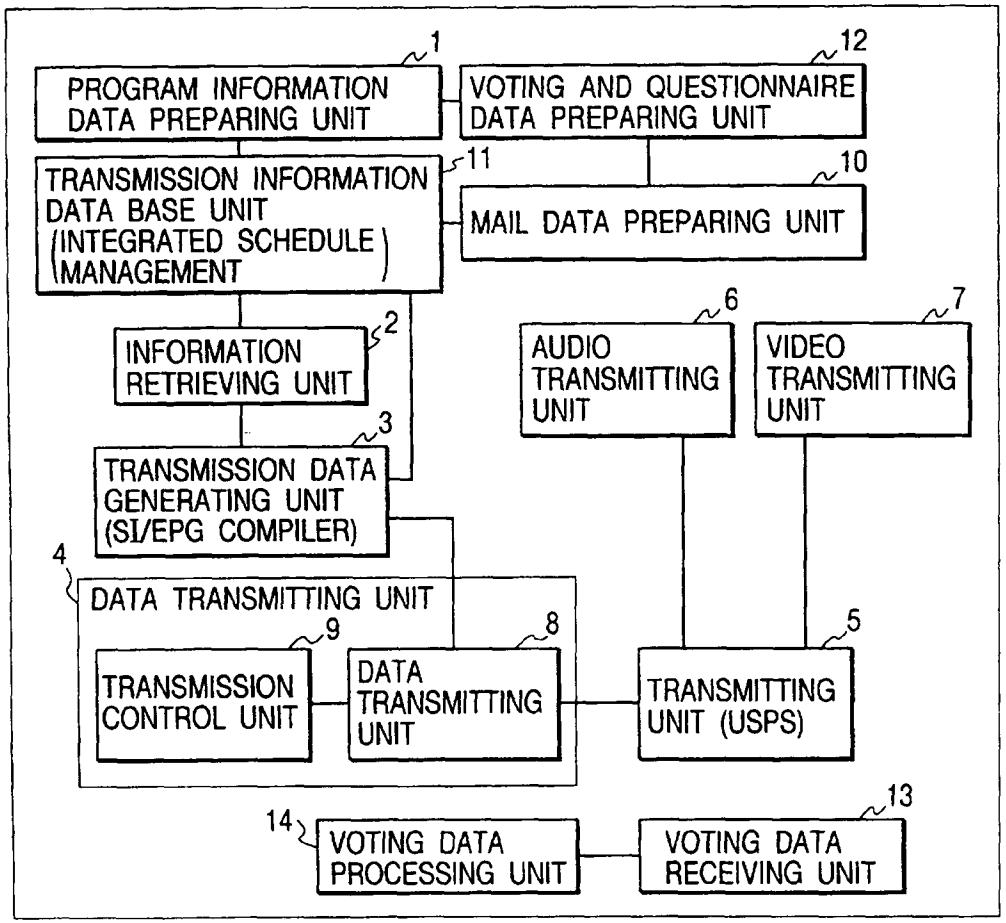
FIG. 1 is a schematical block diagram to show an arrangement of an embodiment of a broadcasting device to operate a program information broadcasting system of the present invention.

In the following, description will be given on embodiments of the present invention referring to the attached drawings. FIG. 1 represents a schematical block diagram showing an arrangement of an embodiment of a broadcasting device serving as a center system to put the program information broadcasting system of the present invention into operation. In this figure, reference numeral 1 represents a program information data preparing unit for dividing program components of a broadcasting program into a plurality of items to turn to data form and for preparing a master data of the program information for introducing or recognizing the program, reference numeral 2 represents an information retrieval unit for retrieving and extracting minimal necessary items for preparation of a program guide from the master data, 3 represents a transmission data generating unit for converting the master data and the program basic information to transmittable data, 4 represents a communication control unit for controlling to transmit the transmission data correctly, 5 represents a transmitting unit for transmitting the transmission data by broadcasting under the control of the communication control unit 4, 6 represents an audio transmitting unit for transmitting audio signal among the transmission data of the program information sent from the transmitting unit 5, 7 represents a video transmitting unit for transmitting video signal among the transmission data of the program information transmitted from the transmitting unit 5, and these functional units constitute basic arrangement of the broadcasting device in the present embodiment. The communication control unit 4 comprises a data transmitting unit 8 for transmitting transmission data generated at the transmission data generating unit 3 and transmission control unit 9 for controlling operation to transmit data in the data transmitting unit. Here, program guide is defined as various forms of program guide prepared according to each of the attributes such as program table where programs offered in each of channels are listed in the order of the time to be broadcast and given in column structure, sports-related programs collectively shown in a summarized table, a weekly program list where recommended programs are listed up for each week.

The broadcasting system in the present embodiment further comprises a mail data preparing unit 10 provided separately from the program information data preparing unit 1 and used for preparing mail data, and transmission information data base unit 11 for integrating the program information data and the mail data and for sending it to the transmission data generating unit 3. The transmission information data base unit 11 integrates the program information data and the mail data and performs schedule management and either sends the program information data and the mail data to the information retrieval unit 2 or sends them directly to the transmission data generating unit 3 without sending them to the information retrieval unit 2.

Further, the broadcasting device in the present embodiment comprises a voting and questionnaire preparing unit 12 for preparing voting and questionnaire data. The voting and questionnaire data preparing unit 12 sends the prepared voting and questionnaire data to the program information data preparing unit 1 or the mail data preparing unit 10.

In addition to the functional units for broadcasting the program information, the broadcasting device in the present embodiment comprises a voting data receiving unit 13 for receiving vote prepared at the voting and questionnaire data preparing unit 12 or data of replies to the questionnaire and a voting data processing unit 14 for processing the received voting data. The broadcasting system is installed at the center such as broadcasting station.

Figure 2:
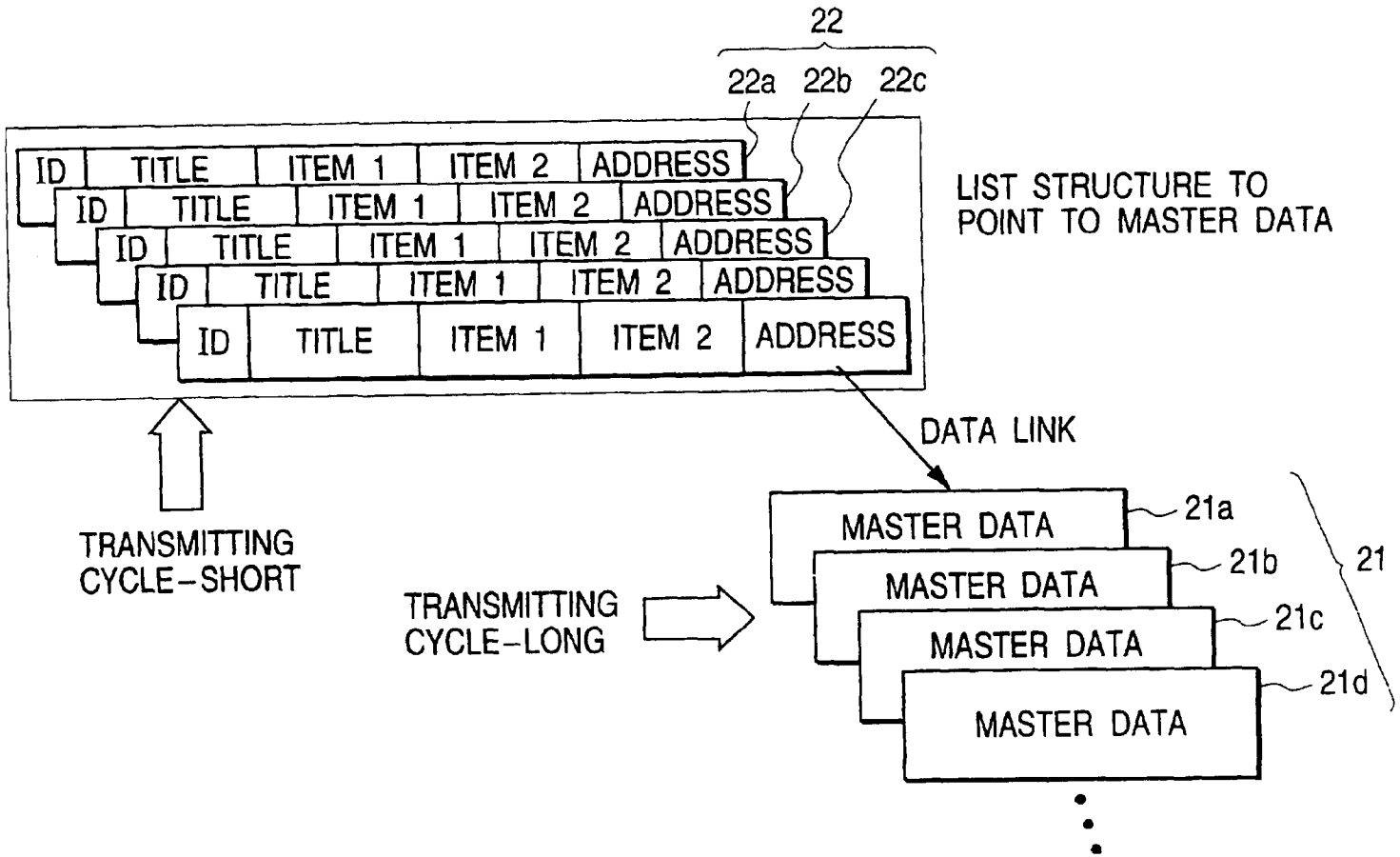
FIG. 2 is a schematical drawing to show a master data of program information and a program basic information prepared by the broadcasting device in the above embodiment.
Figure 3:
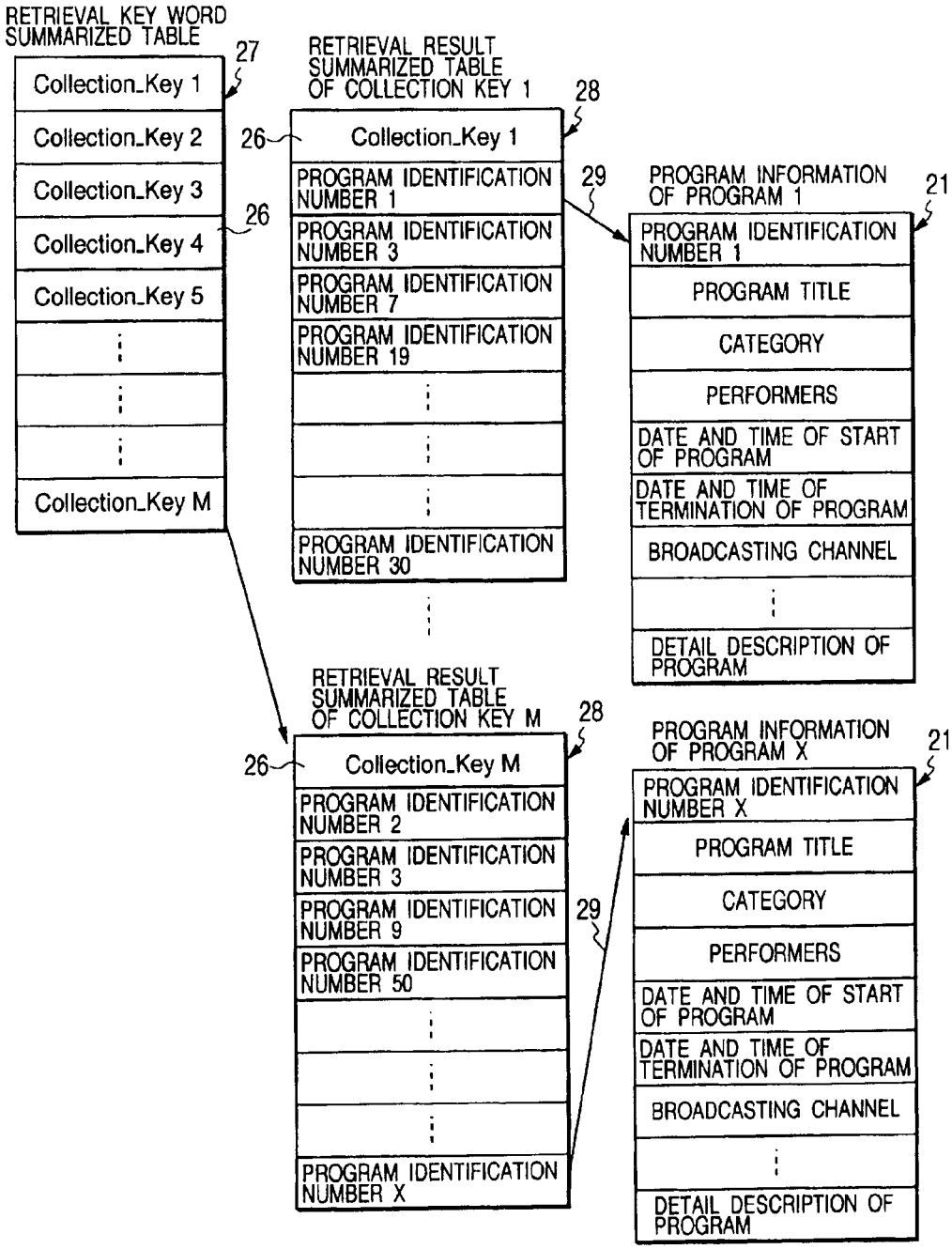
FIG. 3 shows more detail of a data structure of the master data and the program information and the program basic information prepared by the broadcasting device of the above embodiment.
Figure 4:
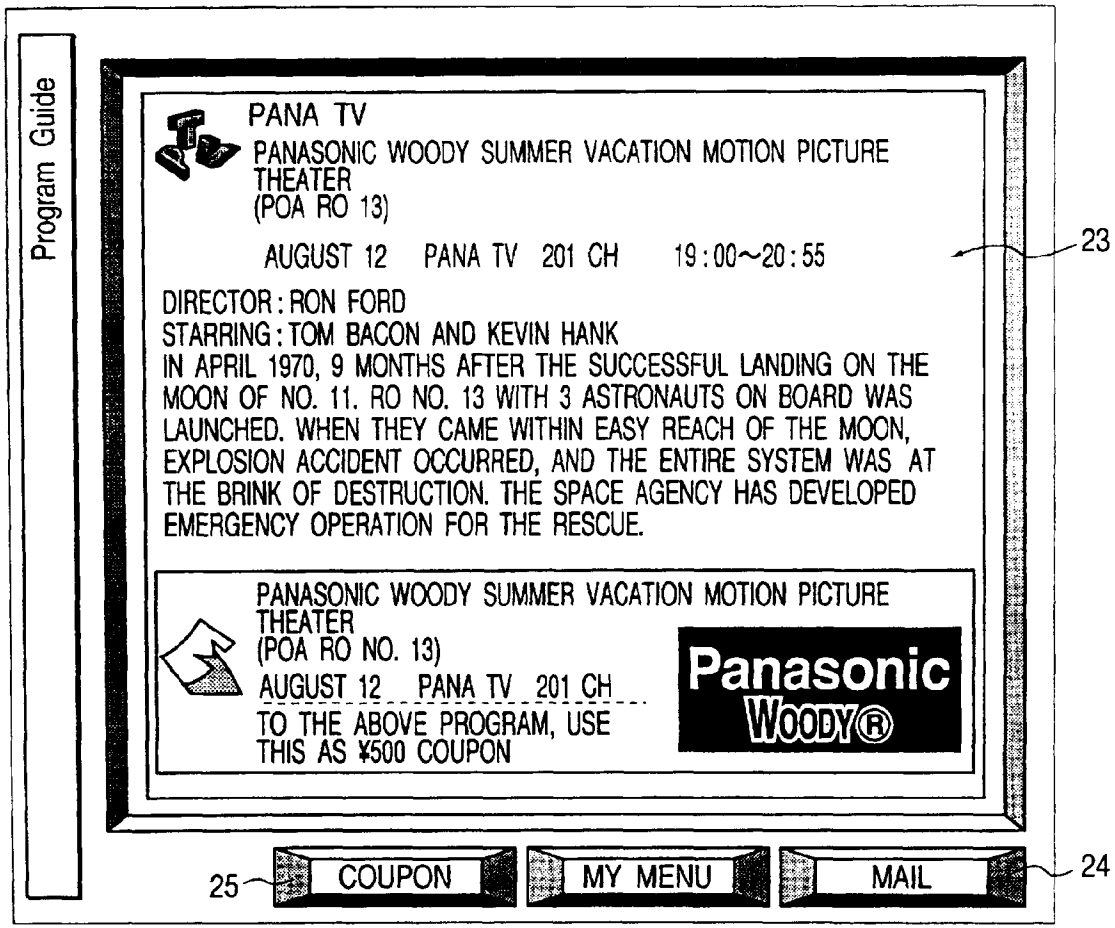
FIG. 4 represents a concrete display example of the master data prepared by the broadcasting device of the above embodiment.

Description will be given now on operation to prepare program information and program basic information and transmission operation in the broadcasting device with the above arrangement. FIG. 2 schematically shows a master data 21 and a program basic information 22 of program information prepared by the broadcasting system of the present embodiment, and FIG. 3 shows the details of the master data 21 and the program basic information 22 in data structure. On this broadcasting system, the program information data preparing unit 1 divides program components of the broadcasting program into a plurality of items and turns them to data form, and prepares the master data 21 (21a, 21b, . . . ) of a plurality of program information to introduce or recognize the program. In the master data 21, the information to introduce the broadcasting program is incorporated as much as possible. As the information to introduce the broadcasting program, there are, as shown in FIG. 3, various items such as program title, category, performers, date and time of starting of broadcasting, date and time of completion of broadcasting, broadcasting channel, detailed description of program (such as information as to whether users can participate or not, whether it is linked to mail, etc.). FIG. 4 represents an example of display of the master data 21. This shows an example where program information of a certain program is displayed on a display 23, and information such as program title, category of program, performers, date and time of starting of broadcasting, broadcasting channel, summary of the details of the program offered as detailed description of the program, information as to whether coupon is provided or linked with mail or not. Also, switches 24 and 25 to start these items are displayed. Further, the information such as personal record of directors, performers or introduction of the related programs can be additionally incorporated. The additional information as described above can be displayed by switching over the screen of the display 23.

The master data 21 thus prepared is sent to the transmission information data base unit 11 from the program information data preparing unit 1, is placed under integrated schedule management and is further sent to the information retrieval unit 2. The master data 21 is sent from the program information data preparing unit 1 to directly to the transmission data generating unit 3.

The information retrieval unit 2 retrieves and extracts minimal necessary items for preparation of the program guide from the master data and prepares a plurality of program basic information 22 (22a, 22b, . . .). The minimal necessary items for preparation of the program guide include the items such as program title, program category, performers, date and time of start of broadcasting, broadcasting channel, etc. In view of the spirit and the scope of the present invention, the retrieval of minimal necessary items for preparation of the above program guide is to partially extract the items necessary for preparation of the program guide from many items, and there is no problem even when the number of the extracted items is increased or decreased to some extent. As shown in FIG. 2, the data of the minimal necessary items such as title, item 1, item 2, . . . are incorporated in the program basic information 22, and ID and address are put to each of the program basic information 22a, 22b, . . . . As the ID, for example, program identification number of each program can be assigned, while other symbol may be used. For the address, information to link each of the program basic information 22a, 22b, . . . with the corresponding master data 21a, 21b, . . . is used. After preparing each of the program basic information 22, the information retrieval unit 2 sends the program basic information 22 to the transmission data generating unit 3. The information retrieval unit 2 may send the prepared program basic information 22 to the transmission data generating unit 3 simply in the order of preparation or may collect the program basic information related to a plurality of programs with a certain relevancy together and may send them to the transmission data generating unit 3. FIG. 2 represents an example of sending of the program basic information 22 to the transmission data generating unit 3 in the latter procedure. For example, all of the program basic information 22 relating to programs in the same category (programs selectively collected according to attributes of the programs such as sports, foreign motion pictures, etc.) are sent together.

In such case, as shown in FIG. 3, each type of attributes is turned to key code for retrieval and extraction (or collection) of the programs to the program basic information. Retrieval key word summarized data 27 where keys (collection keys) 26 used as retrieval key words are listed up and collection key retrieval result summarized data 28 where the program basic information 22 extracted and prepared in the retrieval processing based on each of the collection keys 26 is listed up and additionally prepared. In FIG. 3, collection key 1, collection key 2, . . . , collection key M are listed up in abstract manner as collection keys 26. More concretely, for example, the collection key 1 in the retrieval key word summarized data 27 is a retrieval key word for retrieving and picking up programs relating to "foreign motion pictures" among many programs. Based the retrieval result summarized data 28 of the collection key 1, program identification number 1, program identification number 3, program identification number 7, . . . , program identification number 30 correspond to the programs, for which the program basic information 22 has been prepared according to the retrieval key word.

Similarly, for example, the collection key M in the retrieval key word summarized data 27 is a retrieval key word for retrieving and picking up programs belonging to the category of "sports" among many programs, and this means that program identification number 2, program identification number 3, program identification number 9, . . . , program identification number X correspond to the program, for which the program basic information has been prepared according to the retrieval key word. Incidentally, depending upon the mode of selling of the collection key 26, there may be programs which can be retrieved for any category in the retrieval processing according to a plurality of the collection keys 26 (e.g. the program identification number 3 in FIG. 3). Although not shown in FIG. 3, each of the program identification numbers 26 in the collection key retrieval result summarized data 28 matches ID of the program basic information 22 as already explained, and corresponds to the program basic information 22 of each program. As it is shown by an arrow 29 in FIG. 3, the master data 21 (e.g. identification number 1) is linked to the corresponding program basic information 22 (identification number 1).

To the transmission data generating unit 3, the master data 21 is sent from the transmission information data base unit 11 as described above, and the program basic information 26 is sent from the information retrieval unit 2. The transmission data generating unit 3 converts the master data 21 and the program basic information 22 to transmittable data. This conversion processing is executed, for example, by SI/EPG compiler. As a result, the generated transmission data is sent to the data transmitting unit 8 of the communication control unit 4. The data transmitting unit 8 sends transmission data of the master data 21 and the transmission data of the program basic information 22 under the control of the transmission control unit In the present embodiment, the master data 21 and the program basic information 22 are transmitted at different cycles so that the master data 21 has longer cycle than the program basic information 22. The transmitting operation of the data at different cycles is executed by a control signal outputted from the transmission control unit 9. The transmission cycle is determined, for example, as 5-second cycle for the master data 21 and 1-second cycle for the program basic information 22.

Figure 5:
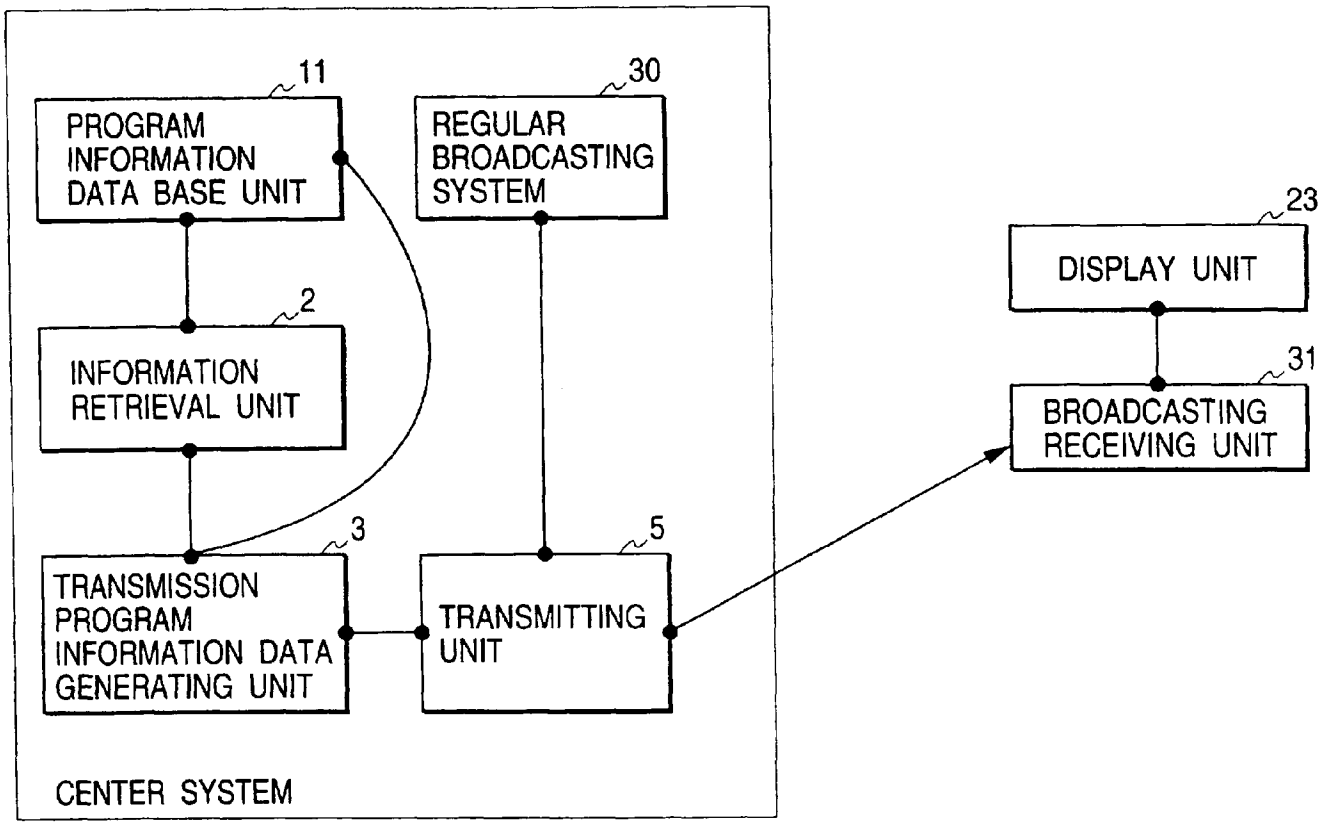
FIG. 5 is a block diagram to show an arrangement of a program information broadcasting system to execute basic operation in the present invention.

The transmission data transmitted from the data transmitting unit 8 is sent to the transmission unit 5, from where it is transmitted as a broadcasting wave signal. In this case, among the transmission data of the program information sent from the transmission unit 5, an audio signal is transmitted from an audio transmitting unit 6, and a video signal is transmitted from a video signal transmitting unit 7. FIG. 5 shows an arrangement of a program information broadcasting system, which executes basic operation in the above embodiment. In FIG. 5, the broadcasting device is also provided with a normal broadcasting system 30 for normal broadcasting.

Figure 6:
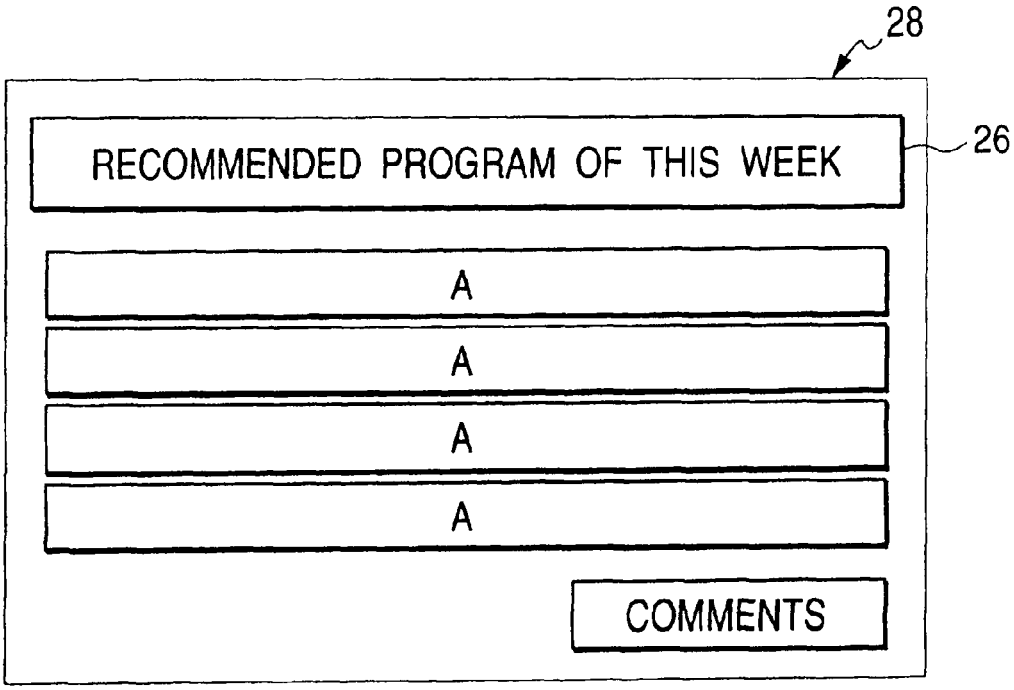
FIG. 6 shows a program guide prepared by extracting programs according to a certain attributes in the program information broadcasting system of the present invention and prepared in a summarized table.

The program information thus broadcast is received by a receiving terminal unit 31 on the user side. The receiving terminal unit 31 receives the program basic information 22 broadcast at shorter cycle, and program guide can be prepared within very short time (almost instantaneously) and the program information is displayed to the user. Using this program guide, the user checks the program on newspaper and other media and also can obtain various types of information of the program on television screen. Also, it is possible to perform operation such as subscription, purchase, etc. of programs using the program guide. A display example is shown in FIG. 6. In this figure, the collection key 26 as explained above is set to "the recommended programs of the week", and the programs belonging to this category are picked up. As a result, the screen of a display 23 where the programs are listed up is shown.

In reality, to transmit the program information (master data 21) on all programs by broadcasting, it normally requires 4 to 5 seconds. Therefore, in normal case, if it is tried to prepare the program guide after the receiving terminal unit receives the above program information, it requires considerable time from the time of instruction to display the program information by the user to the display of the program guide. On the other hand, as already explained, the program basic information 22 comprises far less amount of data than the master data 21, and it requires only short time even when the program basic information 22 relating to all programs is transmitted via broadcasting. Accordingly, the time as short as several seconds is required from the issuance of the instruction to display program information by the user to the preparation of the program guide after all of the program information is received by the receiving terminal unit. Thus, it is possible according to the present embodiment to see the program information within very short waiting time because the program basic information 22 is broadcast at short transmission cycle and because the program basic information 22 has very few data amount. On the other hand, the master data 21 is transmitted at longer cycle and it requires longer time than usual to receive and display the data such as detailed description of the program. However, the waiting time is not a big issue because the user does not necessarily want to see the detailed description of all programs and because the user already knows the outline of the program in the reproduced display of the initial program basic information 21.

Figure 7:
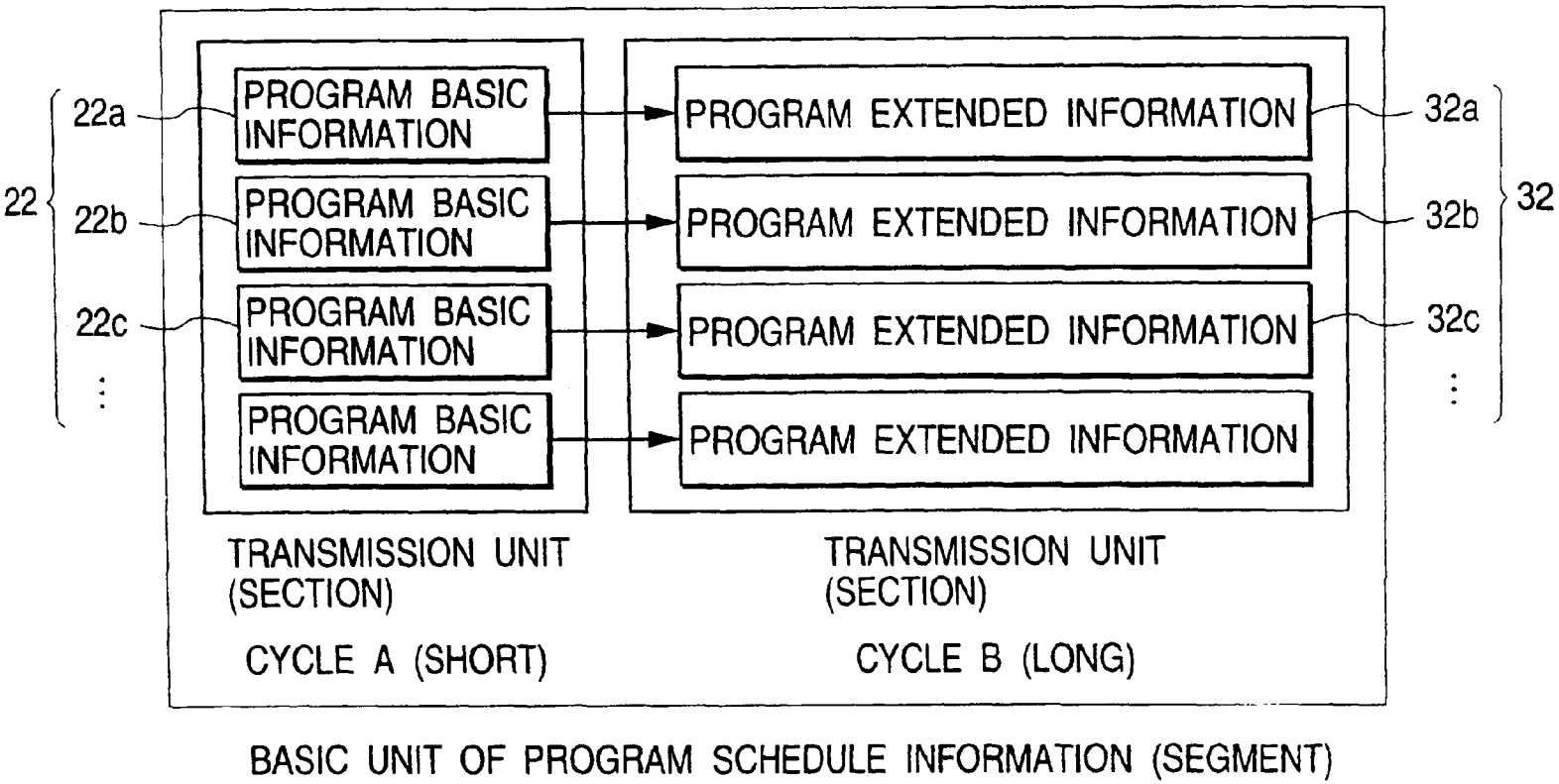
FIG. 7 shows data arrangement where program basic information and program extended information are linked to each other in the above embodiment, and these two types of information constitute the master data.

As it is evident from the above description, data of the minimal necessary items for preparation of the program table are broadcast separately from the master data 21 as the program basic information 22, and it is possible to delete the data used for the preparation of the program basic information 22 from the master data 21, to prepare program extended information 32 (32a, 32b, . . . ), and to broadcast the program extended information 32 instead of the master data 21. In this case, the program basic information 22 is linked to the program extended information 32. FIG. 7 shows an arrangement where the program basic information 22 is linked to the program extended information 32 and these two types of information constitute the master data 21. In this case, again, as explained above, the program extended information 32 and the program basic information 22 are transmitted at different cycles so that the transmission cycle of the program extended information 32 has longer cycle than the program basic information 22. The operation to transmit the data at different cycles can be executed according to a control signal from the transmission control unit 9.

Further, in the broadcasting system at the center, mail can be prepared and broadcast in addition to the preparation and transmission of the program information. The mail and the program information are linked to each other, and it is designed in such manner that the receiving terminal unit can gain access to the link data of the program information from the received mail. The mail is prepared by the mail data preparing unit 10. In the preparation of the mail, if voting of the users is requested or expected in the content of the mail, voting and questionnaire data as necessary is prepared by the voting and questionnaire data preparing unit 12, and it is transferred to the mail data preparing unit 10. In this case, the mail data preparing unit 10 incorporates the voting and questionnaire data into the mail data and sends it to the transmission information data base unit 11. Also, the voting and questionnaire data prepared at the voting and questionnaire data preparing unit 12 may be sent to the program information data preparing unit 1 and may be incorporated in the program information. In this case, again, the program information data preparing unit 1 incorporates the voting and questionnaire data into the program information data and sends it to the transmission information data base unit 11.

Figure 8:
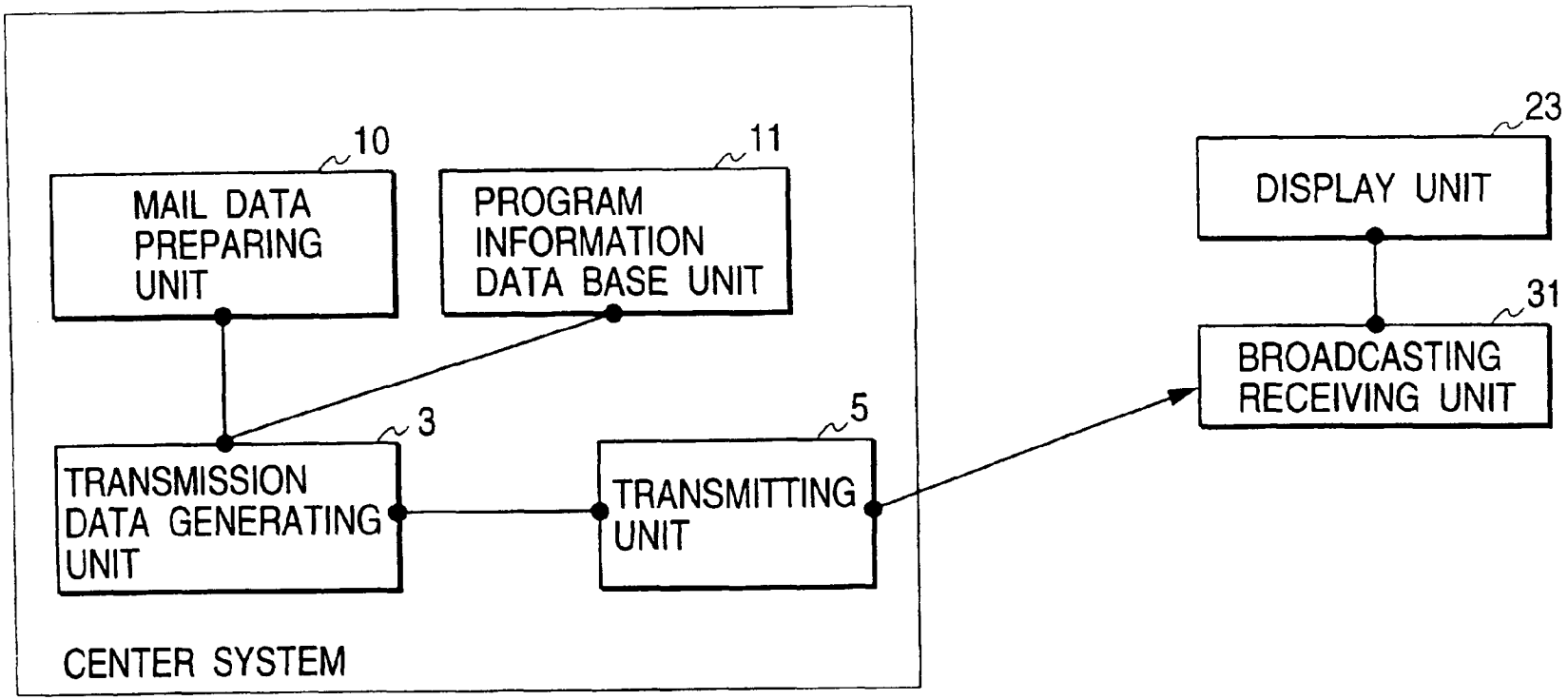
FIG. 8 is a block diagram to show an arrangement of the program information broadcasting system to execute one-direction broadcasting operation of mails by the broadcasting in the above embodiment.
Figure 9:
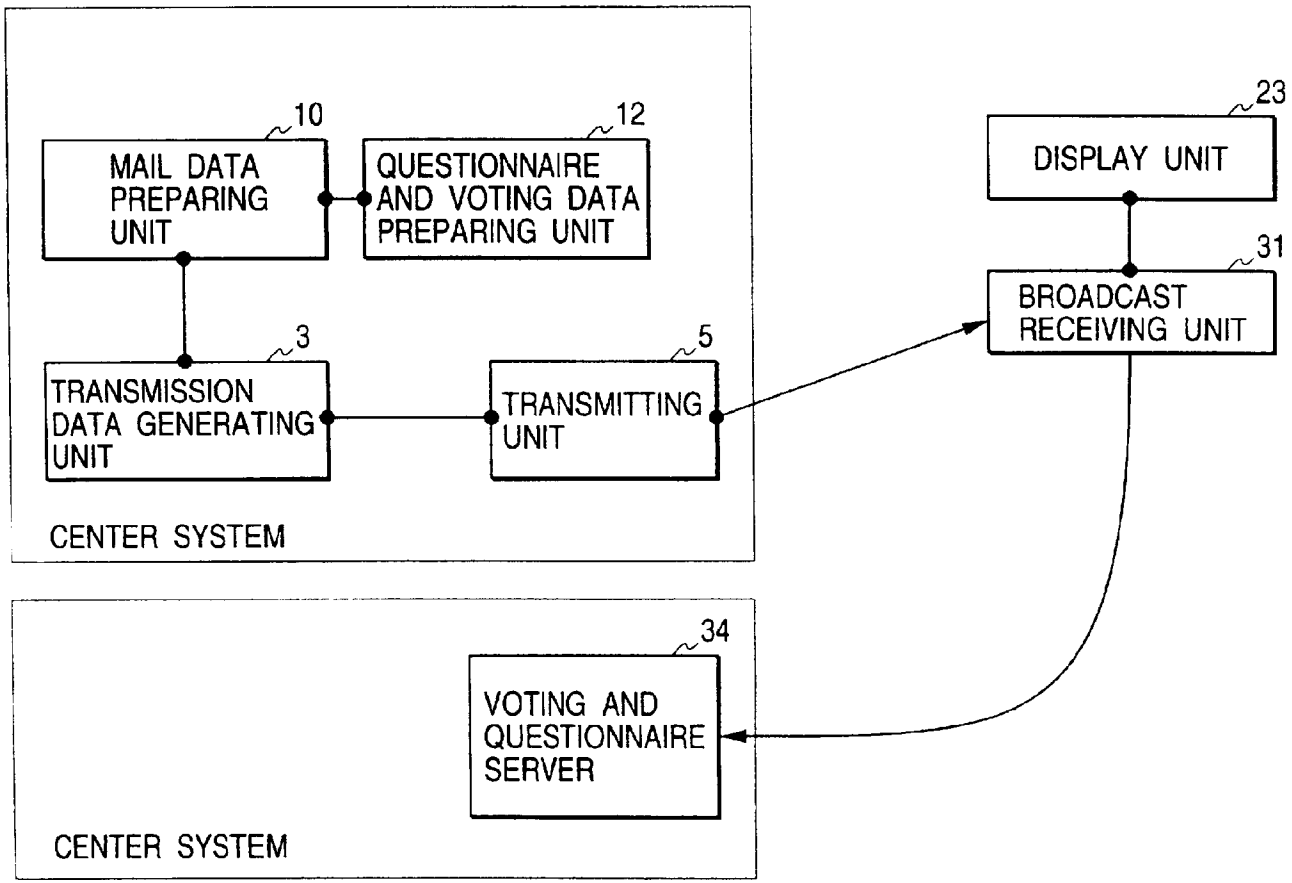
FIG. 9 is a block diagram to show an arrangement of the program information broadcasting system to execute operation to broadcast the mail associated with voting and questionnaire reply by the broadcasting device in the above embodiment.

The subsequent transmission operation is almost the same as the transmission operation of the program information as described above. The transmission data is generated at the transmission data generating unit 3, and it is sent to the transmission unit 5 from the data sending unit 8 and is broadcast as broadcasting wave signal. FIG. 8 represents a block diagram of an arrangement of the program information broadcasting system to execute broadcasting operation in one direction of the mail by the broadcasting system in the present embodiment. The broadcast mail is received by the receiving terminal unit 31 on the user side and is displayed on the display 23. FIG. 9 is a block diagram of an arrangement of the program information broadcasting system to execute broadcasting operation to broadcast the mail associated with voting and questionnaire reply by the broadcasting system in the present embodiment. The broadcast mail is received by the receiving terminal unit 21 on the user side and is displayed on the display 23. The vote or reply to the questionnaire from the users are received by the voting data receiving unit 13 of the broadcasting system, and after being processed at the voting data processing unit 14, the data are stored at the voting and questionnaire server 34.

The broadcasting system broadcasts a summarized table of the mails at the transmission of the mails and checks whether the items listed in the summarized table of the mails are already read or not at the receiving terminal unit 31, and displays only the mails not yet read. Further, at the transmission of the mail, the mail may be transmitted together with some receiving condition. The receiving terminal unit 31 checks whether the user of the terminal unit satisfies the receiving condition or not and receives and displays the mail only when the user satisfies the receiving condition.

Figure 10:
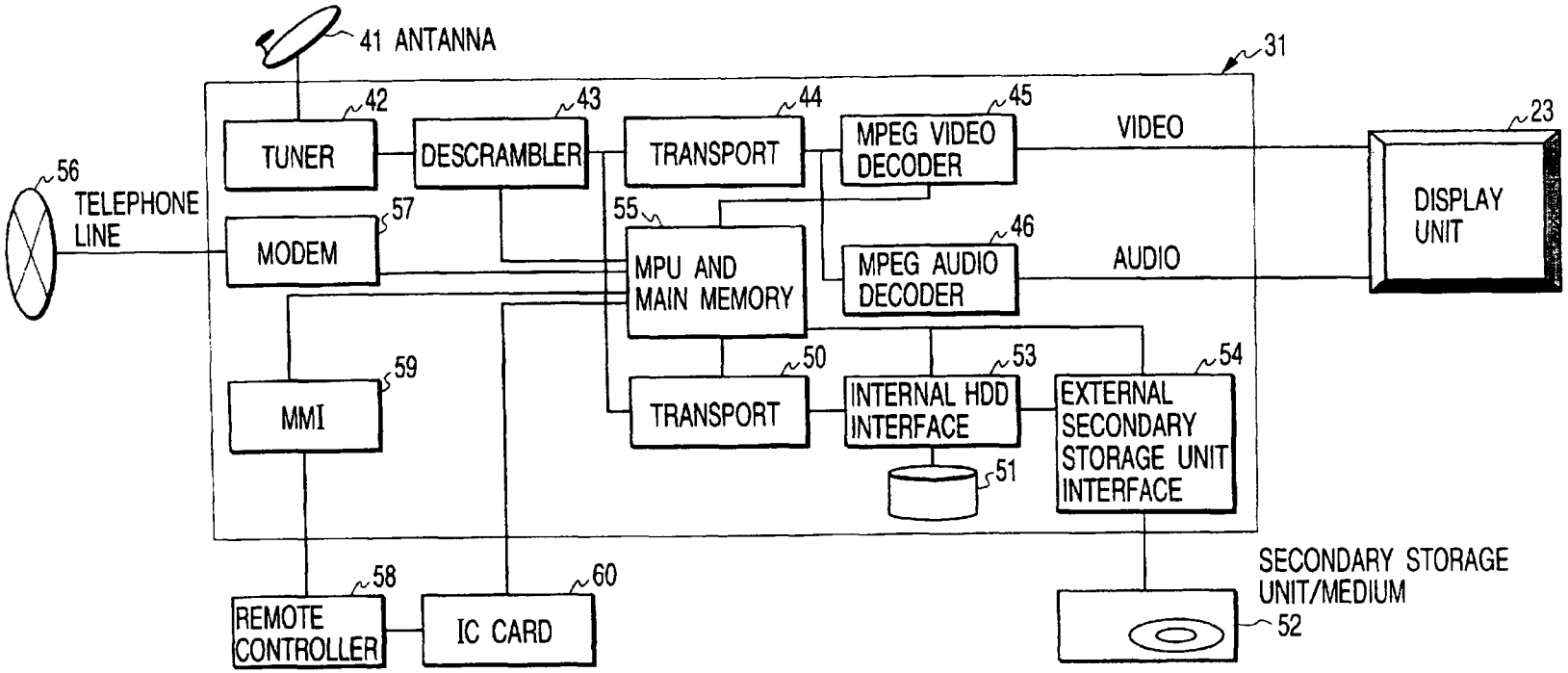
FIG. 10 is a block diagram to show an arrangement of an embodiment of a receiving terminal unit incorporated in the program information broadcasting system of the present invention.

FIG. 10 is a block diagram to show an arrangement of an embodiment of a receiving terminal unit 31 incorporated in the program information broadcasting system of the present invention. As this receiving terminal unit 31, a multi-media storage display unit is used, for example. It has principally a function as a receiving terminal in the above program information broadcasting system and, when necessary, may be used as a transmitting terminal to transmit a viewer attribute information, a viewing result information or a reply coupon information 15 to the center. In FIG. 10, reference numeral 41 represents an antenna for receiving broadcasting, 42 represents a tuner for detecting a signal by tuning with the receiving electric wave, 43 represents a descrambler for decoding encrypted receiving signal, 44 represents a transport for selecting and picking up necessary information from the received data, 45 represents an MPEG video decoder for decoding video from the information picked up by the transport 44 and for generating compressed video data, 46 represents an MPEG audio decoder for decoding audio data from the information picked up by the transport 44 and for generating compressed audio data. And a reference numeral 23 represents a display unit for displaying or outputting video signals and audio signals respectively obtained by the MPEG video decoder 45 and the MPEG audio decoder 46.

Reference numeral 50 represents a transport for selecting and picking up the data from the information of data broadcasting and for transferring it to the storage unit, 51 represents a disk unit for storing and accumulating the received broadcasting data, 52 represents a secondary storage unit serving as an external storage medium to be set separately from the disk unit 51 for storing and accumulating the received broadcasting data, 53 represents an internal HDD interface for performing operation matched with the other functional units in order to store the data in the disk unit 51, 54 represents an external secondary storage unit interface for operation matching with the other functional units in order to store the data in the secondary storage unit 52, and 55 represents a data processing control unit having programs for executing data processing and various types of data such as viewer program of characters, and it comprises an MPU and a main storage unit. Reference numeral 56 represents a public telephone line, 57 represents a model for modulating and demodulating transmitting and receiving data connected between the public telephone line 56 and the data processing unit 55, 58 represents a remote controller for remote control of operation command to the receiving terminal unit, 59 is a man-machine interface for transmitting and receiving to and from the remote controller 58 and for sending the signal to the data processing control unit 55, and 60 represents an IC card connected with the data processing control unit and for executing various types of operation. In the data processing control unit 55, a crypt decoding means, i.e. a program for decoding coupon information encrypted in the internal main memory, is stored. This decoding program may be stored in the IC card 60.

The receiving terminal unit 31 with the above arrangement performs operation such as receiving of program information prepared and broadcast by the above broadcasting device or receiving of mail voting by the mail or sending reply to the questionnaire. In the basic operation of the receiving terminal unit 31, the receiving terminal unit 31 receives program information transmitted from the broadcasting device, i.e. master data and program basic information. Based on the display instruction of the program information by the user, master data is received and displayed at the instruction to display detailed information. On the other hand, when the instruction to display the program table only, e.g. to display a list of recommended programs is inputted, the program basic information is received and the specified program guide is displayed.

On the other hand, the receiving terminal unit 31 is capable to perform other operation in addition to the receiving operation to match the program information broadcasting system of the present invention as described above. Specifically, in the broadcasting device, normal program information (i.e. master data) are transmitted by the normal broadcasting system. On the receiving terminal unit 31, the program information is stored in the disk unit 51 regardless of whether there is an instruction to display the program information from the user or not. From the program information stored in the disk unit 51, only the minimal necessary items are retrieved and extracted for preparing the program guide by operation of the data processing control unit 55, and a plurality of program basic information 22 (22a, 22b, . . . ) are prepared. In this case, the following two summarized data may be additionally prepared to the program information broadcasting system 22: retrieval key word summarized data 27 where collection keys 26 are listed up and collection key retrieval result summarized data 28 where program basic information 22 extracted and prepared in the retrieval processing based on each of the collection keys 26 are listed up. The program basic information 22 thus prepared is stored in the internal memory of the data processing control unit 55. That is, the internal memory of the data processing control unit 55 is utilized as a supplementary memory or a cache memory. It is needless to say that an external memory or a part of the storage medium of the above disk unit 51 may be used as the storage means serving as cache memory.

In this case again, similarly to the case of the stage to prepare the program basic information at the center side, the program basic information may be prepared by extracting the information with higher utilization frequency or may be prepared by extracting the data based on the predetermined attributes from the master data of the program information. The attributes, serving as basis for preparation of program basic information, may be related to at least one of program category, individual information, or service provider, and it may be designed in such manner that a plurality of program basic information may be prepared as many as relating to the above attributes. A plurality of program basic information thus prepared may comprise data, in which the attributes serving as basis for preparation of the program basic information are turned to key codes and are prepared in a summarized table, and the data, in which identification information of the program extracted according to the attributes is prepared in a summarized table. Further, the data prepared by turning the attributes to key code and arranged in a summarized table is linked to the data prepared by turning the identification information in a summarized table, and this may be stored in the internal memory for the storage of the program basic information.

If there is no instruction to display the program information from the user, the data processing control unit 55 stores the received program information in the disk unit 51 at a predetermined cycle. Further, by operation of the data processing control unit 55, only the minimal necessary items for preparation of the program guide are retrieved and extracted from the program information accumulated in the disk unit 51, and a plurality of program basic information 22 (22a, 22b, . . . ) are prepared, and the data in the internal memory are updated by the newly prepared program basic information 22. When the instruction to display program information is inputted by the user, the data processing control unit 55 reads the program basic information from the internal memory and prepares an electronic program guide or other program guide within very short time (almost instantaneously). By transferring this to the display 23, the program information is displayed to the user. Using this program guide, the user can check the program on newspapers or other media and can obtain various types of information of the program on television screen. Also, using this program guide, various operations such as subscription, purchase, etc. of the program can be performed.

As described above, according to the present invention, program elements constituting a broadcasting program are divided into a plurality of items and are turned to data at a center as a program information broadcasting system, and master data of the program information to recognize the program is prepared. From various data contained in the master data, minimal necessary items for preparation of the program guide are extracted and program basic information is prepared. The master data and the program basic information are transmitted simultaneously with the broadcasting, and before the master data is completely received by a receiving terminal unit, the program basic information is received, reproduced and displayed. As a result, it is possible to incorporate the program basic information which has far less amount of data than the master data and to minimize the time until the data are completely stored in memory on the receiving terminal unit. For this reason, it is possible to retrieve and quickly perform processing to display the data on a display screen and to raise efficiency in the operation to display the program information.

Because mail transmission using broadcasting is linked to the broadcasting of the program information and voting or reply to questionnaire from the user can be obtained, it is possible to minimize amount of information of the mail itself and to improve efficiency to utilize the mail.

In the receiving terminal unit for receiving digital satellite broadcasting, the prepared program basic information 22 is stored in the internal memory of the data processing control unit 55. By utilizing the internal memory of the data processing control unit 55 as cache memory, when the instruction to display the program information is inputted by the user, the program basic information 22 can be read from the internal memory, and the program guide such as electronic program guide can be instantaneously prepared, and by transferring this to the display, program information can be displayed to the user. As a result, the user can quickly perform operation such as subscription, purchase, etc. of the program using the program guide.

What is claimed is:

[1. A program information broadcasting system, comprising:

means for assembling a master data compilation of program information for recognizing a broadcast program, wherein program elements of said broadcasting program are divided into a plurality of items and are converted to data at a broadcasting center;

means for assembling basic information with a minimum of necessary items sufficient for preparation of a program guide, wherein said basic information is extracted from said data constituting said master data compilation, said program basic information including extracted items of all of programs included in said master data compilation so that the amount of data in said basic program information is considerably smaller than that of said master data;

means for transmitting said master data and said program basic information simultaneously with broadcasting programs; and means for receiving, reproducing and/or displaying said program basic information before completion of receipt of said master data at a receiving terminal unit.]

[2. A program information broadcasting system according to claim 1, wherein, at said broadcasting center, said means for preparing said program basic information is arranged to prepare said program basic information by extracting information with high utilization frequency from said master data.]

[3. A program information broadcasting system according to claim 1, wherein said means for preparing said program basic information is arranged to prepare said program basic information by extracting data based on predetermined attributes from the master data of the program information.]

[4. A program information broadcasting system according to claim 3, wherein the attributes serving as basis for preparation of the program basic information are related to at least one of program category, individual information or service provider.]

[5. A program information broadcasting system according to claim 4, wherein said means for preparing said program basic information is arranged to prepare a plurality of types of program basic information, and wherein said plurality of types of information are as many as are related to said attributes.]

[6. A program information broadcasting system according to claim 5, wherein said plurality of program basic information comprise data, which are prepared by turning the attributes serving as basis for preparation of said program basic information to key code and are arranged in a summarized table, and data, which are prepared by arranging identification information of the program extracted using said attributes as basis in a summarized table, whereby said data prepared by turning said attributes to key code and arranged in a summarized table are linked to said data prepared by arranging identification information in a summarized table.]

[7. A program information broadcasting system according to claim 1, wherein said means for transmitting said master data and said program basic information is arranged to transmit said master data and said program basic information at cycles that are different from each other.]

[8. A program information broadcasting system according to claim 7, wherein said means for transmitting said master data and said program basic information is arranged to transmit said master data at a longer cycle than said program basic information.]

[9. A program information broadcasting system according to claim 1, further comprising:

means for preparing program extended information by deleting the data used for preparation of the program basic information from the master data; and means for linking the program basic information with the program extended information;

wherein said means for transmitting is arranged to transmit said program basic information and said program extended information simultaneously with the transmitting of programs.]

[10. A program information broadcasting system according to claim 1, further comprising means for preparing mail, and the means for preparing said mail is arranged to broadcast mail from the broadcasting center in addition to transmission of the program information, and said mail is linked to said program information so that the receiving terminal unit can gain access to the linked data of the program information from the received mail.]

[11. A program information broadcasting system according to claim 10, further comprising means for preparing voting and questionnaire data related to a call function to enable viewers to participate in voting or questionnaire and the voting and questionnaire data are incorporated in the mail to be transmitted.]

[12. A program information broadcasting system according to claim 11, wherein the means for transmitting is arranged to broadcast a summarized table of mails, and further comprising means at the terminal unit for checking whether the items listed in the summarized table of mails have been already read or not, and means for displaying only the mails not yet read.]

[13. A program information broadcasting system according to claim 11, wherein the means for transmitting is arranged to transmit an e-mail together with some receiving condition, and means are provided at the terminal unit for checking whether the user of the terminal unit satisfies said receiving condition or not, and the e-mail is displayed only when the user satisfies the receiving condition.]

[14. A broadcasting device, comprising:

program information data preparing means for dividing program elements, constituting a broadcasting program, into a plurality of items and turning them into data and for preparing a master data list of program information that is adapted to recognize the program;

information retrieval means for retrieving minimal necessary items for preparation of a program guide from the master data list;

program basic information preparing means for preparing program basic information using said minimal necessary items obtained by said information retrieval means, said program basic information including extracted items of all programs included in said master data so that the amount of data in said program basic information is substantially smaller than the amount of data in said master data;

transmission data generating means for converting said master data and said program basic information to transmittable data; and transmitting means for transmitting said transmittable data.]

[15. A broadcasting device according to claim 14, wherein there are further provided mail data preparing means separately arranged from said program information data preparing means and used for preparing mail data, and transmission information data base means for integrating the program information data with the mail data and sending to the transmission data generating means.]

[16. A broadcasting device according to claim 15, wherein said transmission information data base means is arranged to send the integrated data of the program information data and the mail data to the information retrieval means.]

[17. A broadcasting device according to claim 15, further comprising:

voting and questionnaire data preparing means for preparing voting and questionnaire data and for sending the voting and questionnaire data to the program information data preparing means;

voting data receiving means for receiving voting data including replies from subscribers to questionnaire(s); and voting data processing means for processing the received voting data.]

[18. A broadcasting device according to claim 17, wherein said voting and questionnaire data preparing means is arranged to send the prepared voting and questionnaire data to the mail data preparing means.]

[19. A receiving terminal unit, comprising:

receiving means for receiving a master data list of a broadcast program information;

program basic information preparing means for extracting a minimal number of items necessary for preparation of a program guide from the received master data, and for preparing a program basic information, said program basic information including extracted items of all programs included in said master data so that the amount of data in said program basic information is substantially smaller than that of said master data;

storage means for storing data of said program basic information;

data reproducing means for reproducing data of the received program information and the program basic information; and control means for controlling various types of operations, whereby:

when an instruction to display program information is inputted, said control means receives the master data of said program information, and prepares a summarized table of the programs by reading program basic information from said storage means.]

[20. A receiving terminal unit according to claim 19, wherein said program basic information is prepared by extracting information with a higher utilization frequency from said master data.]

[21. A receiving terminal unit according to claim 19, wherein said program basic information is prepared by extracting data based on predetermined attributes from the master data of the program information.]

[22. A receiving terminal unit according to claim 21, wherein said attributes serving as basis for preparation of the program basic information are related to at least one of program category, individual information or service provider.]

[23. A receiving terminal unit according to claim 22, wherein said plurality of types of program basic information are prepared as many as related to said attributes.]

[24. A receiving terminal unit according to claim 23, wherein said plurality of program basic information comprise data, which are prepared by turning the attributes serving as basis for preparation of said program basic information to key code and are arranged in a summarized table and data prepared by arranging identification information of the program extracted using said attributes as basis in a summarized table, and said data prepared by turning said attributes to key code and arranged in a summarized table are linked to the data prepared by arranging the identification information in a summarized table.]

[25. A program information broadcasting method, comprising the steps of:

preparing a master data of program information for recognizing a broadcast program wherein program elements of said broadcasting program are divided into a plurality of items and wherein said items are converted to data at a broadcasting center;

preparing a program basic information list, comprising a minimal number of items that are necessary for the preparation of a program guide, that are extracted from said master data, said program basic information including extracted items from all programs included in said master data so that the amount of data in said program basic information is substantially smaller than the amount of data in said master data;

transmitting said master data and said program basic information simultaneously with broadcasting a program; and receiving, reproducing and/or displaying said program basic information before completion of receipt of said master data at a receiving terminal unit.]

[26. A program information broadcasting method according to claim 25, wherein said program basic information is prepared by extracting information from said master data that has a higher utilization frequency.]

[27. A program information broadcasting method according to claim 25, wherein said program basic information is prepared by extracting data, based on predetermined attributes, from the master data of the program information.]

[28. A program information broadcasting method according to claim 27, wherein the attributes serving as basis for preparation of the program basic information are related to at least one member of the group consisting of a program category, individual information about an individual subscriber or information about a a service provider.]

[29. A program information broadcasting method according to claim 28, further comprising preparing a plurality of types of program basic information, wherein there are as many types of program basic information as there are attributes.]

[30. A program information broadcasting method according to claim 29, wherein said plurality of program basic information comprise data, which are prepared by converting the attributes serving as basis for preparation of said program basic information to key code(s) and arranging them in summarized table form, and preparing data, by arranging identification information of the program(s) extracted using said attributes, as basis in said summarized table, whereby said data prepared by converting said attributes to key code that are arranged in a summarized table are linked to said data prepared by arranging identification information in a summarized table.]

[31. A program information broadcasting method according to claim 25, wherein said master data and said program basic information are transmitted at cycles different from each other.]

[32. A program information broadcasting method according to claim 31, wherein said master data are transmitted at a longer cycle than said program basic information.]

[33. A program information broadcasting method according to claim 25, further comprising preparing program extended information by deleting the data used for preparation of the program basic information from the master data, linking the program basic information and the program extended information and transmitting the linked data.]

[34. A program information broadcasting method according to claim 25, further comprising linking an e-mail to said program information so that the receiving terminal unit can gain access to the linked data of the program information from the received e-mail, and transmitting said e-mail from said broadcast center in addition to transmitting program information.]

[35. A program information broadcasting method according to claim 34, further comprising incorporating, in the transmitted e-mail, a data to call function to enable viewers to participate in voting on questionnaire(s).]

[36. A program information broadcasting method according to claim 35, further comprising broadcasting a summarized table of the e-mails together with said e-mail(s), checking at a receiving terminal unit whether the e-mails listed in the summarized table of e-mails have been already read or not, and displaying only the e-mails not yet read.]

[37. A program information broadcasting method according to claim 35, further comprising transmitting at least one e-mail together with at least one receiving condition, checking, at the receiving terminal unit, whether the user of the terminal unit satisfies said receiving condition or not, and displaying an e-mail only when the user satisfies the receiving condition.]

[38. A program information broadcasting system, comprising:

means for preparing a master data of program information for recognizing a broadcast program, wherein program elements of said broadcasting program are divided into a plurality of items and means for converting said items to data at a broadcasting center;

means for preparing a program basic information with a minimal number of items necessary for preparation of a program guide, including means for extracting said items from said data constituting said master data;

means for transmitting said master data and said program basic information simultaneously with the broadcast program; and means for receiving, reproducing and/or displaying said program basic information before completion of receipt of said master data at a receiving terminal unit;

further comprising:

means to broadcast mail from said broadcast center in addition to transmission of the program information;

means for linking said mail to said program information so that the receiving terminal unit can gain access to the linked data of the program information from the received mail, and a data to call function that enables viewer(s) to participate in voting and/or questionnaire data incorporated in the mail.]

[39. A program information broadcasting system according to claim 38, further comprising a summarized table of the mails, means for broadcasting said table, means for checking, at the receiving terminal unit, whether the items listed in the summarized table of the mails have been already read or not, and means for displaying only the mails not yet read.]

[40. A program information broadcasting system according to claim 38, further comprising a receiving condition that is transmittable with said mails, means for checking at the receiving terminal unit whether the user of the terminal unit satisfies said receiving condition or not, and means for displaying mail only when the user satisfies the receiving condition.]

*41. A program information broadcasting method, comprising:*

*preparing program basic information including a title and an ID for each of a plurality of programs; and*

*transmitting said program basic information;*

*wherein said program basic information further comprises an address that links said program basic information to master information; and*

*wherein said program basic information and said master information are derived only from a same plurality of programs to be broadcast.*

*42. A program information broadcasting method, comprising:*

*preparing program basic information including a title and an ID for each of a plurality of programs; and*

*transmitting said program basic information;*

*wherein said program basic information further comprises an address that links said program basic information to master information;*

*wherein said program basic information and said master information are derived only from a same plurality of programs to be broadcast; and*

*wherein said program basic information is received before completion of receipt of said master information.*

* * * * *